Oct. 10, 1961 C. M. L. L. BOURCIER DE CARBON 3,003,597
SHOCK ABSORBERS
Original Filed Feb. 21, 1955 2 Sheets-Sheet 1
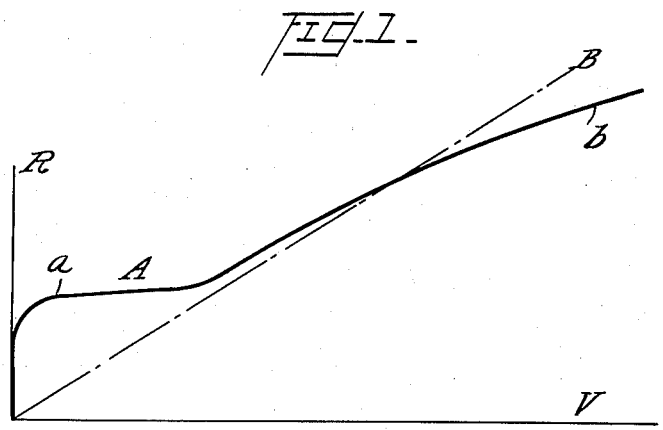
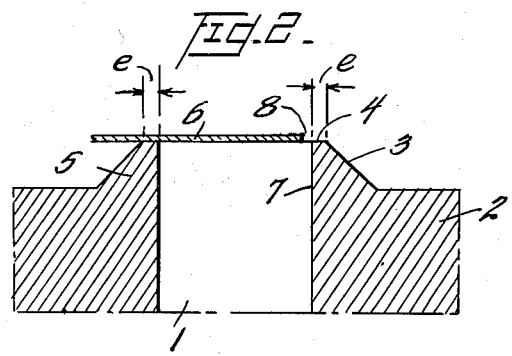
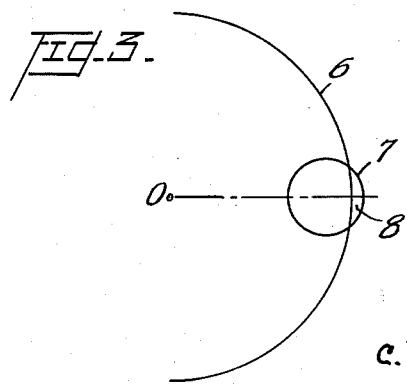
INVENTOR
C. M. L. L. Bourcier de Carbon
BY Watson, Cole, Grindle & Watson
ATTORNEYS Oct. 10, 1961  C. M. L. L. BOURCIER DE CARBON  3,003,597
SHOCK ABSORBERS
Original Filed Feb. 21, 1955  2 Sheets-Sheet 2
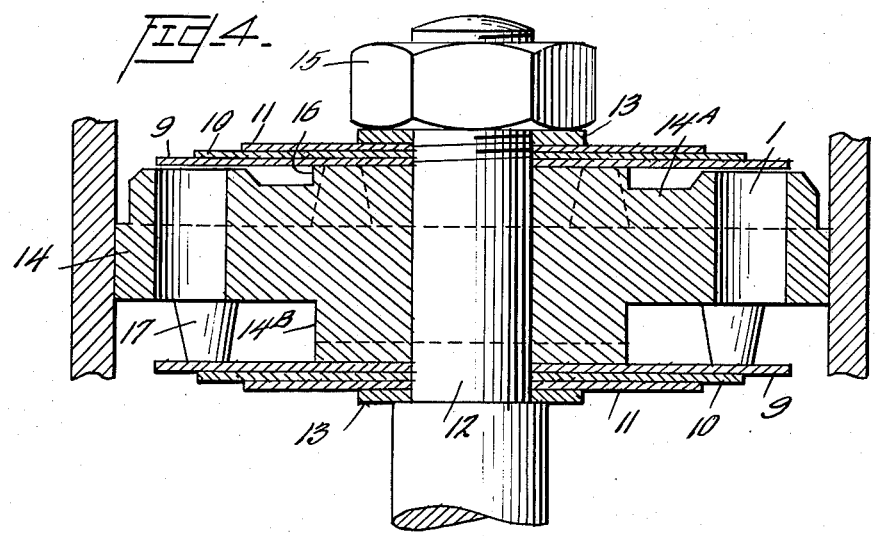
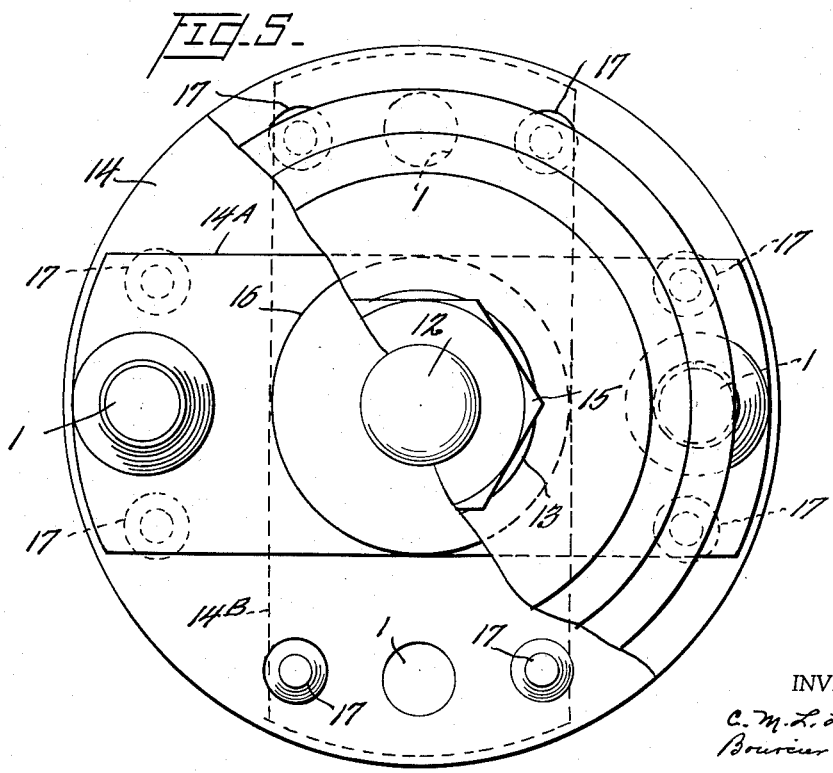
INVENTOR
C. M. L. L.
Bourcier de Carbon
BY Watson, Cole, Grindle & Watson
ATTORNEYS

United States Patent Office 3,003,597
Patented Oct. 10, 1961

3,003,597
SHOCK ABSORBERS
Christian Marie Lucien Louis Bourcier de Carbon,
64 Blvd. Maurice-Barres, Neuilly-sur-Seine, France
Original application Feb. 21, 1955, Ser. No. 489,694.
Divided and this application Mar. 11, 1959, Ser. No. 798,708
3 Claims. (Cl. 188—88)

This invention relates to shock absorbers and more particularly to shock absorbers of the fluid displacement type adapted especially for use on automotive vehicles, although capable of employment in cushioning or braking shocks sustained by other devices and mechanisms.

This application is a division of my copending application Serial No. 489,694, filed February 21, 1955, now forfeited, which application is a continuation-in-part of my application Serial No. 230,944, filed June 11, 1951, now Patent No. 2,748,898.

More particularly the invention relates to improvements in pistons used in such hydraulic devices, which pistons are provided with passageways leading from one side to the other thereof, the passageways being controlled by disc or flap valves usually consisting of a thin resilient sheet of metal or other suitable material.

It is the general object of the present invention to provide a novel and improved shock absorber piston in which the curve of shock absorber resistance as a function of the piston velocity is approximately a straight line. More specifically, it is an object of the invention to attain a construction and operation of the piston by providing novel valving arrangements which control the by-passing of fluid from one side of the piston to the other during operation so that the aforesaid object of the invention in straightening the resistance-velocity curve may be attained.

Other objects and features of novelty will be apparent from the following specification when read in connection with the accompanying drawings in which certain embodiments of the invention are illustrated by way of example.

In the drawings:

FIGURE 1 is a graph in which certain characteristics of the shock absorber of this general type are indicated by curves, and in which the resistance R of the damping is shown as a function of piston velocity V;

FIGURE 2 is a fragmentary vertical sectional view through the valved orifice portion of a by-pass passageway through the piston of a shock absorber embodying the principles of my invention; the relationship of this orifice to the other parts of the piston being readily apparent from a comparison with FIGURE 6, described below;

FIGURE 3 is a diagrammatic plan view of the orifice valve arrangement shown in FIGURE 2;

FIGURE 4 is a vertical sectional view of a shock absorber piston illustrating a still further modification of the valving provisions; and FIGURE 5 is a top plan view of the piston shown in FIGURE 4, with a portion of the valving broken away to better illustrate the construction of the piston body.

In order to obtain the best possible damping, particularly in the case of shock absorbers for land vehicles, it is preferable that the curve of the resistance R of the shock absorber, as a function of the speed V of the piston thereof, be as near a straight line as possible. It has been found that this curve, in the case of pistons of the general construction of that shown in my aforesaid Patent No. 2,748,898 (that is, where the sheet or disc valves seat upon an orifice opening out of a plane surface) has the shape indicated at A in the graph comprising FIGURE 1 of the present drawings.

In other words, a substantial viscous resistance opposes the flow of oil during operation so long as the valves are not raised or opened a considerable amount, say a distance of the order of magnitude of a few tenths of a millimeter. The hydraulic force necessary to open the valves to this initial extent is equivalent in practice to a resistance which would be encountered by very small movements of the piston as during travel of the vehicle on a relatively smooth paved street or boulevard, and this makes such boulevard riding less smooth than should be expected.

The improvements which are the subject of the present invention are directed primarily at bringing the said curve A as close to the straight line indicated at B in the graph, as possible.

One way of initiating this conformation of the curve A would be to add other passageways through the piston which are not controlled by the valving provisions. The presence of such passageways and orifices tends to flatten the curve near the origin, but without having any practical effect beyond this.

Secondly, one may proceed by combating this phenomenon at its source by seeking to decrease the constant viscosity resistance to flow through the valve, by seeing to it that the streams of liquid through the orifices are made laminar or flattened over the smallest possible length of their course, say for example, for a distance not substantially more than approximately 1 mm.

This result can be obtained in various ways, particularly by the following means which may be applied either separately or one in combination with any or all of the others;

(a) The thin sheet which constitutes the resilient disc valve may be so cut that its peripheral edge is practically tangential to the margin of the orifice, so that the covering of the orifice is at a minimum (such as in my Patent No. 2,748,898);

(b) The seat surrounding the orifice against which the valve closes may be made extremely thin or narrow rather than with a wide supporting surface for the valve, at least over a part of the periphery thereof. For example, the valve seat may be provided in the general shape of the edges of a crater of a volcano (see also, for example, my Patent No. 2,815,100, granted December 3, 1957);

(c) This effect may probably best be attained by providing a valving construction whereby the orifice controlled by the disc valve is permanently open to an exceedingly small extent. This result can be obtained by arranging the periphery of the disc valve a little short of tangency with the periphery of the orifice thus leaving a very small space between these peripheries as at 8 in FIGURES 2 and 3.

For purposes of convenience, it might be well to describe in detail the embodiments shown in FIGURES 4 and 5 first since they, although fragmentary in execution, show the mounting of the piston on the piston rod and the fitting of the piston to the walls of the shock absorber cylinder. The piston rod is provided with narrowed or attenuated end portion 12, the extreme end of which is provided with screw threads upon which is adapted to be screwed the retaining nut 15. Just above the shoulder at the base of the portion 12 and just below the nut 15, there are disposed retaining washers or discs 13 which fit snugly around the piston rod stem 12 and enclose between themselves the piston and valving structure.

The central portion 14 of the piston is circular in transverse section and fits snugly within the cylindrical walls of the shock absorber cylinder as clearly shown in FIGURE 4. Somewhat along the lines of the piston illustrated in my Patent No. 2,748,898, a basically oblong raised portion is formed on the upper surface of the midportion 14 and extends from right to left of FIGURES 4 and 5 and is designated 14A. A similar oblong boss designated 14B is formed on the underside of the intermediate portion 14 of the piston and extends at right angles to the top boss. In this example, two pairs of fluid passageways extend through the piston, two of the passageways passing through the intermediate portion 14 and the upper extended oblong portion 14A, these being shown in FIGURE 4, and two of them passing through the intermediate portion 14 and the lower oblong boss 14B as shown at the top and bottom portions of FIGURE 5. The passageways shown in FIGURE 4 are the rebound passageways and their orifices opening out through an annular frusto-conical boss formed in the portion 14A are adapted to be controlled by the stack of valving discs 9, 10 and 11 shown at the top of FIGURE 4. Any desired number of these discs may be employed depending upon the qualities of the shock absorber desired, and they are preferably of graduated diameters, the larger disc of course nearest the orifices.

The opposite passageways 1, those shown at the top and bottom of FIGURE 5, are compression orifices and open downwardly through similar cone-like or crater-like orifices which are controlled by the lower sets of valve discs 9, 10 and 11.

In order to maintain the initial planar position of the valve discs, and to protect them against fatigue and breakage and to prevent reverse bending, pedestals or supports 17 are provided, these supports occurring in pairs which are spaced at approximately 90° from the mouth of the orifices upon the same side of the piston. For example, the pedestal 17 disclosed in solid lines at the bottom of FIGURE 5 tends to limit the closing of the valve discs which control the upper orifice of the passageway 1 which occurs at the left side of FIGURE 5; whereas the pedestals 17 which occur at both side portions of FIGURES 4 and 5 (shown in solid lines in FIGURE 4 and dotted lines in FIGURE 5) serve to limit the closed position of the lower set of valves 9, 10 and 11 which control the orifices of the openings at the top and bottom of FIGURE 5. In their limited minimum opening positions the valves are spaced a very slight distance, of the ordered magnitude of say a few tenths of a millimeter, away from the mouth of the orifices as clearly shown in the valving illustrated in the upper portion of FIGURE 4.

A circular boss 16 is provided on the oblong upper and lower bosses 14A and 14B, the upper one of these bosses being clearly shown in FIGURES 4 and 5 at 16, and the sets of valve discs are clamped between the circular bosses and the respective retaining plates or washers 13. In this way, the stack of resilient discs is given great rigidity in its central portion while retaining flexibility in its peripheral portion.

Another solution which can be combined with any one of the previously described embodiments consists of causing the valve disc 6 to close somewhat short of the outer marginal portion 7 of the orifice 1, as illustrated in FIGURES 2 and 3. In other words, the periphery of the valve disc 6 is positioned inwardly of the point of tangency with the periphery 7 of the orifice, thus leaving a small cusp-like opening or crack 8 through which the damping fluid may pass.

It is also within the scope of the invention to use in any of the embodiments, either a single disc valve as shown in FIGURES 2 and 3 or multiple graduated sheets of foil of decreasing dimensions, as shown in FIGURES 4 and 5.

Referring back again to FIGURE 1 of the drawings, it can be seen that the curve A of resistance of the shock absorber as a function of the speed V of the piston has near its origin a portion $a$ which is quite far away from the straight line B. The explanation of this shape of the curve is that the flow of the damping liquid when the valve consists of a sheet of foil, and when the seat of the valve is a broad flat surface, is opposed (in the case of very small lifting motions) by substantial viscous resistance or stickiness. In order that the flow become normal and of any substantial degree, it is necessary that the valve foil or disc be raised several tenths of a millimeter. Due to these phenomena, furthermore, the temperature variations which exert an influence on the viscosity of the liquid, modify the operation of the shock absorber.

These phenomena are all the more important the more viscous the liquid (for example oil) used as the damping medium in the shock absorber. Now it is preferable to use a viscous liquid in these shock absorbers for other reasons, in particular to decrease the possibility of leakage between the piston and the cylinder and to avoid the harmful influence of any possible lack of precision in the production of the tubes or cylinders and pistons.

The applicant has found that it is possible to overcome this drawback to a certain degree by imparting to the valve seat about the piston orifice such a shape that the contact of the valve disc does not take place along a wide flat surface, but along a narrow annular seating which is as close to line contact as is practicable. This feature is clearly shown in FIGURE 2 of the drawings in which the orifice in general is of a cone-like configuration 5 having an outer frusto-conical surface 3 and the actual seating of the valve taking place along the lip 4, the extremely narrow dimension $e$ of which is reduced as much as possible with due regard to the strength of the materials used. In the case of pistons made of alloys such as that known as Zamak (which is a zinc-base, die-casting alloy containing approximately 4% of aluminum, approximately 0.04% of magnesium, and from zero to approximately 1.0% of copper), and a valve of sheet steel, the value of $e$ for an orifice 1 having a diameter of approximately 7 mm., may advantageously be between about 0.3 and about 1 mm. Of course, the actual profile of the orifice rim 5 could be varied from that shown provided that the supporting area is reduced as just described.

In straightening the part $b$ of the curve A to bring it more in line with the straight line B, the diameters of the orifices of the passageway through which the damping liquid moves from one side of the piston to the other, should be selected properly. The resistance to the flow of the oil through the passageway orifices themselves is of course added to a certain extent to the resistance to the flow of oil between the valves and their seats. This resistance to flow through the passageway orifices themselves can therefore be controlled to straighten the portion $b$ of the curve A and bring it closer to the straight line B. It is therefore one factor of the present invention to not only select an approximate optimum cross-section of the passage openings but also, and this is very important, the variation of this optimum cross-section as a function of the reduction ratio $r$ between the stroke of the wheel with respect to the frame and the stroke of the piston in the shock absorber cylinder. In the event that the orifices of the piston consist of two groups of cylindrical ports, the applicant has discovered that the optimum diameter $d$ of the orifices, given in millimeters, is approximately according to the following equation:

$$d=\left(\frac{7+2r}{r}\right)\frac{D}{46}$$

in which D is the inner diameter of the cylinder, also in millimeters. For a cylinder of the diameter of 46 mm. this corresponds to an optimum diameter of the orifices of 9 mm. when the value of $r$ is close to 1 (which condition frequently occurs in connection with the rear shock absorbers of present-day automobiles), and corresponds to an optimum diameter of 5.5 mm. when the value of $r$ is close to 2 (frequently the case in front shock absorbers of present-day automobiles).

This value of the diameter of the orifices (or of the equivalent area in the case of non-circular orifices or in the case of a different number of orifices) can vary about 20% up or down with respect to the optimum value given by the above formula, without going beyond the scope of the present invention.

Under these conditions, in the case of shock absorbers for land vehicles in accordance with the present invention, the diameters of the passageway openings in the pistons of the front and rear shock absorbers may differ for one and the same vehicle, this being contrary to the usual practice up to the present time in the case of hydraulic shock absorbers employing valved pistons.

It will be readily understood that the principles of the present invention are applicable to embodiments in which groups of more than one passageway are provided for transmitting fluid in given directions upon diametrically opposite sides of the axis, as disclosed in the parent application Serial No. 489,694 and in the copending other divisional application Serial No. 798,707, filed contemporaneously with the present application.

It is understood that various changes and alterations may be made in the embodiments illustrated and described herein without departing from the scope of the invention as defined by the following claims.

Having thus described the invention, what is claimed as new and desired to be secured by Letters Patent is:

1. A double acting shock absorber of the class described, comprising a cylinder containing a working fluid, a piston contained therein and adapted to reciprocate within said cylinder and to have its movements damped by means of said fluid, said piston having oppositely facing axially spaced fluid contacting surfaces, and a piston rod fixed to said piston and extending through an opening in one end of the cylinder; said piston provided with two sets of passageways therethrough through which fluid may pass from one side of the piston to the other during working movement of the piston, one of said sets of passageways serving to transmit fluid in one direction through the piston and another different set of said passageways serving to transmit fluid in the opposite direction therethrough, the passageways of each set being substantially equally spaced from the axis of the piston, the passageways of said sets having inlet and outlet orifices on the respective sides of the piston, the outlet orifices being substantially circular, and valve means controlling the flow of fluid in said respective sets of passageways; said valve means comprising at least one completely circular flat resilient leaf element secured fixedly adjacent its center to the central portion of one face of the piston and at least one completely circular flat resilient leaf element secured fixedly adjacent its center to the central portion of the opposite face of the piston; said leaf elements on the respective sides of the pistons each adapted to extend over and resiliently control the flow of working fluid from the circular outlet orifices of the set of passageways debouching on its respective side of the piston, and the inlet orifices of the other set of passageways on that side of the piston being spaced away from said circular leaf element so as not to be controlled thereby, the said outlet orifices at each surface of the piston being substantially in the plane of the leaf element which controls them and opening individually through that surface of the piston, whereby flow through each passageway is individually controlled; the diameter of each of the circular resilient leaf elements being less than the diameter of a circle embracing the outer arcuate edge portions of the outlet orifices of the passageways controlled by said element, whereby the peripheral margins of said elements are offset radially inwardly from the said arcuate outer edge portions so that there are provided permanently open crescent-shaped segmental openings in said outlet orifices, the size of said crescent-shaped openings being thus controllable to a fine degree by the substitution of valve disc elements of various selected diameters.

2. A double acting shock absorber of the class described, comprising a cylinder containing a working fluid, a piston contained therein and adapted to reciprocate within said cylinder and to have its movements damped by means of said fluid, and a piston rod fixed to said piston and extending through an opening in one end of the cylinder; said piston provided with passageways therethrough through which fluid may pass from one side of the piston to the other during working movement of the piston, one of said sets of passageways serving to transmit fluid in one direction through the piston and another different set of said passageways serving to transmit fluid in the opposite direction therethrough, and valve means controlling the flow of fluid in said respective sets of passageways; said respective sets of passageways for transmitting fluid in the two opposite directions each arranged in only two groups of at least one passageway each, the said groups of each set being positioned exactly diametrically opposite each other on opposite sides of the axis of the piston, and the groups of the set for flow in one direction being spaced 90° from the adjacent groups of the set for flow in the opposite direction; the passageways of each set being substantially equally spaced from the axis of the piston, the passageways of said sets having inlet and outlet orifices on the respective sides of the piston, the outlet orifices being substantially circular, said valve means comprising at least one completely circular flat resilient leaf element secured fixedly adjacent its center to the central portion of one face of the piston and at least one completely circular flat resilient leaf element secured fixedly adjacent its center to the central portion of the opposite face of the piston; the leaf elements on each side of the piston adapted to extend over and resiliently control the flow of working fluid from the outlet orifices on the sets of passageways debouching on its respective side of the piston, and the inlet orifices of the other set of passageways on that side of the piston being spaced away from said circular leaf element so as not to be controlled thereby, the said outlet orifices being substantially in the plane of the leaf element which controls them whereby flow through the respective passageways is individually controlled, the outlet orifices of the respective passageways for transmitting fluid in opposite directions being disposed beneath diametrically opposite portions of the respective leaf elements at points remote from the axis thereof so that the leaf elements are stressed and resiliently bent only in a simple substantially cylindrical configuration by fluid issuing under pressure from the openings which they cover, the controlled outlet orifices of the passageways debouching from the piston surface toward the leaf valve element which controls it, through a raised boss the top of which provides a narrow annular seating surface for said element; the diameters of the respective circular leaf valve elements being less than the diameter of a circle embracing the outer edge portions of the outlet orifices of the passageways respectively controlled by said elements, whereby the peripheral margins of said elements are offset radially inwardly from the said outer edge portions so that there are provided permanently open crescent-shaped segmental openings in said outlet orifices.

3. A double acting shock absorber of the class described, comprising a cylinder containing a working fluid, a piston contained therein and adapted to reciprocate within said cylinder and to have its movements damped by means of said fluid, and a piston rod fixed to said piston and extending through an opening in one end of the cylinder; said piston provided with passageways therethrough through which fluid may pass from one side of the piston to the other during working movement of the piston, certain of said passageways serving to transmit fluid in one direction through the piston and other of said passageways serving to transmit fluid in the opposite direction, the passageways of each set being substantially equally spaced from the axis of the piston, the passageways of said sets having inlet and outlet orifices on the respective sides of the piston, the outlet orifices being substantially circular, and valve means controlling the selective flow of fluid in said respective passageways; said passageways being arranged so that the first named passageways for flow in said one direction are circumferentially spaced from the second named passageways for flow in the opposite direction, said respective passageways for transmitting fluid in the two opposite directions each arranged in two groups of at least one orifice each, said groups positioned exactly diametrically opposite each other on opposite sides of the piston; said valve means comprising at least one flat resilient leaf element secured to the intermediate portion of one face of the piston and at least one flat resilient leaf element secured to the intermediate portion of the opposite face of the piston, said leaf elements adapted in repose to extend over the respective outlet orifices of the respective passageways which they control and to be spaced remotely from the inlet orifices of the other passageways, the outlet orifices of the respective passageways for transmitting fluid in the same direction being disposed beneath diametrically opposite portions of said respective leaf elements at points remote from the axis thereof so that the leaf elements are stressed and resiliently bent only in a simple substantially cylindrical configuration by fluid issuing under pressure from the openings which they cover; the respective faces of the piston having flat plane surfaces in two axially spaced levels, the passageways for flow of fluid in one direction having their intake orifices on one face of the piston at a level axially inset from the level of said surface in which the outlet orifices of the other passageways are formed; and the valve leaf elements being secured to the respective piston faces approximately at the outer levels, whereby they control the outlets of the appropriate passageways and lie in planes spaced axially from the plane of the inlet openings of the other passageways, the diameters of the respective circular leaf valve elements being less than the diameter of a circle embracing the outer edge portions of the circular outlet orifices of the passageways respectively controlled by said elements, whereby the peripheral margins of said elements are offset radially inwardly from the said outer edge portions so that there are provided permanently open crescent-shaped segmental openings in said outlet orifices.

References Cited in the file of this patent

UNITED STATES PATENTS

| | | |
|---|---|---|
| 1,866,167 | Lolley | July 5, 1932 |
| 2,467,098 | Rossman | Apr. 12, 1949 |
| 2,673,625 | Crabtree | Mar. 30, 1954 |
| 2,676,676 | Strauss et al. | Apr. 27, 1954 |
| 2,811,226 | Allinquant | Oct. 29, 1957 |
| 2,821,268 | Carbon | Jan. 28, 1958 |
| 2,888,107 | De Koning et al. | May 26, 1959 |
| 2,941,629 | Rohacs | June 21, 1960 |

FOREIGN PATENTS

| | | |
|---|---|---|
| 1,084,675 | France | July 13, 1954 |